(12) United States Patent
Bellavance et al.

(10) Patent No.: US 9,020,631 B1
(45) Date of Patent: Apr. 28, 2015

(54) OPPORTUNISTICALLY CONSOLIDATED PICKING

(71) Applicant: Amazon Technologies, Inc., Reno, NV (US)

(72) Inventors: Denis Bellavance, Seattle, WA (US); Michael Cy Wu, Seattle, WA (US); Robert James Wilson, Seattle, WA (US); Bryan Michael Psimas, Seattle, WA (US); Mona Mehrandish, Seattle, WA (US); Jacob Marshall Austin, Seattle, WA (US); Salman Hamid Ali, Toronto (CA); Nishant Singh, Seattle, WA (US); Fnu Arun Singhal, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/108,584

(22) Filed: Dec. 17, 2013

(51) Int. Cl.
*G06F 7/00* (2006.01)
*G06Q 50/28* (2012.01)

(52) U.S. Cl.
CPC .................................... *G06Q 50/28* (2013.01)

(58) Field of Classification Search
CPC combination set(s) only.
See application file for complete search history.

(56) References Cited

U.S. PATENT DOCUMENTS 7,295,990 B1 * 11/2007 Braumoeller et al. ....... 705/7.31

* cited by examiner

*Primary Examiner* — Yolanda Cumbess
(74) *Attorney, Agent, or Firm* — Thomas Horstemeyer, LLP (57) ABSTRACT

Disclosed are various embodiments for consolidating multiple pickings of an item to fulfill multiple shipments into a single picking of the multiple items. A determination is first made whether a metric representing a plurality of shipments exceeds a threshold, wherein individual ones of the plurality of shipments are mapped to corresponding ones of a plurality of item locations in a fulfillment center. The plurality of shipments are then remapped to an individual one of the plurality of item locations in response to a determination that the metric exceeds the threshold. Finally, a picking of the items is initiated.

20 Claims, 5 Drawing Sheets

OPPORTUNISTICALLY CONSOLIDATED PICKING

BACKGROUND

Shipments of items are often assembled and fulfilled from distribution or fulfillment centers where the items are stored. Items are pulled from the inventory located at the distribution or fulfillment center by employees, packed, and shipped. Items in the inventory in the fulfillment center may be stored in one or more locations within the fulfillment center, either together as a group or separately throughout the fulfillment center.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure involves various embodiments for consolidating retrieval of items to be shipped from an inventory storage area in a fulfillment center. A fulfillment center may be any one of a number of material handling facilities, such as a warehouse, distribution center, or similar facility. The number of unfulfilled shipments for a particular item that are assigned to the fulfillment center is monitored. As shipments are assigned to the fulfillment center, the shipments or items within the shipments are mapped to locations of items within the fulfillment center. When fulfilling a given shipment, one or more pickers on pick routes stop at item locations mapped to the shipment to retrieve the items to be shipped. In situations where multiple shipments exist that include the same or a common item, inefficiencies may be created as multiple pickers on multiple pick routes attempt to separately retrieve the item for their respective shipments. For example, one or more units of an item may be stored at different locations throughout the fulfillment center. According to various embodiments, when the number of unfulfilled shipments for a particular item exceeds a threshold number, the unfulfilled shipments are remapped to a shared item location or set of item locations and consolidated into a single pick route. In some embodiments, wherein some of the unfulfilled shipments include multiple items, individual item locations for the particular item to be picked are remapped to a shared item location or set of item locations and consolidated into a single pick route. In various embodiments, the shared item location is a single item location, such that multiple shipments for the item can be fulfilled by a picker on a single pick route. As such, picking for shipments for the same item are consolidated, thereby increasing efficiency and providing other benefits.

In the following discussion, a general description of the system and its components is provided, followed by a discussion of the operation of the same.

Figure 1:
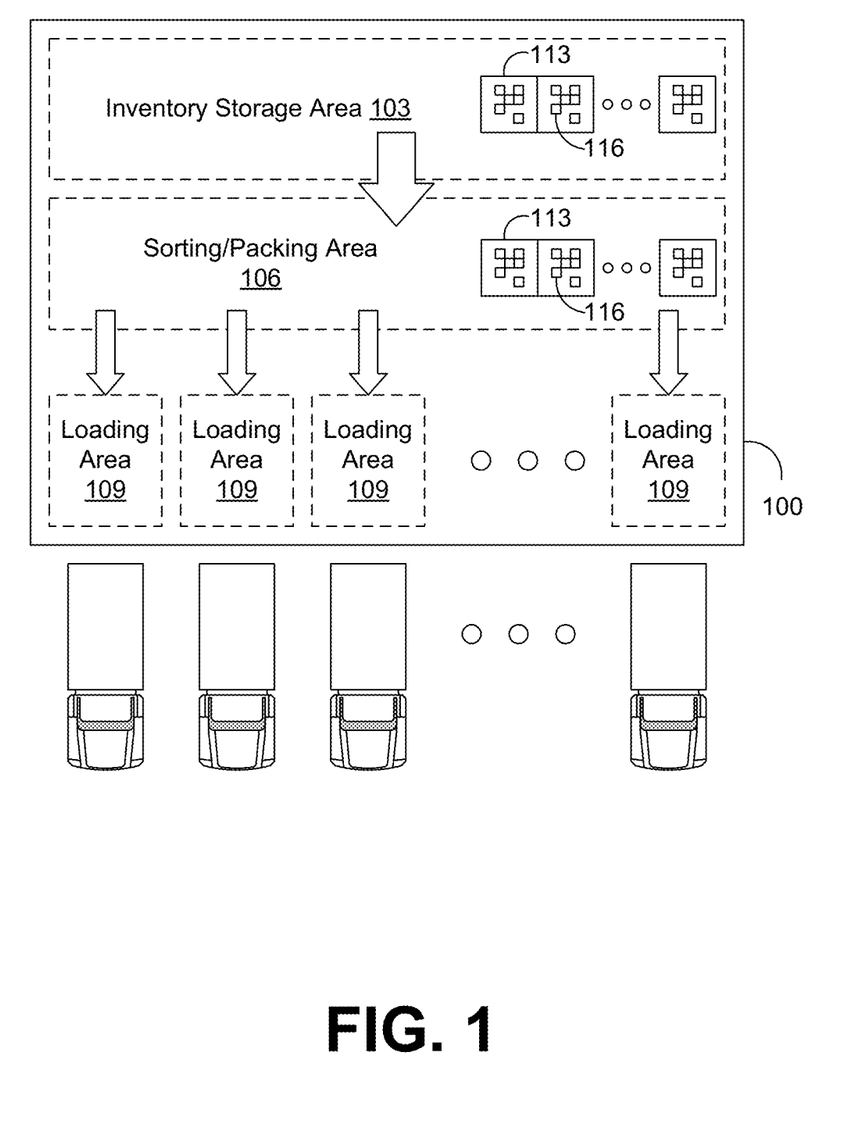
FIG. 1 is a drawing of a fulfillment center according to various embodiments of the present disclosure.

Beginning with FIG. 1, shown is a pictorial diagram of a fulfillment center 100. A fulfillment center 100 is any material handling facility where orders for items are fulfilled and/or shipments of items corresponding to orders originate. As such, a fulfillment center may, for example, correspond to a warehouse, a distribution center, a processing center, or a similar structure. A fulfillment center 100 may be divided into multiple sections. For example, a fulfillment center 100 may include one or more inventory storage areas 103, one or more sorting/packing areas 106, and one or more loading areas 109 where shipments are loaded onto delivery vehicles for delivery to customers or other recipients pursuant to orders for such items. The fulfillment center 100 may also have one or more mechanisms or methods for moving items between sections, including conveyors, forklifts, robotic handling equipment, and other means. In addition, a fulfillment center 100 may have one or more pickers or other employees who traverse pick routes or other paths generated by a shipment or order fulfillment system or process in order to retrieve items within the fulfillment center 100 for shipment.

The inventory storage area 103 includes one or more item locations 113 where one or more items 116 may be located for long-term or bulk storage. An item location 113 may correspond to any number of physical structures. For example, a shelf, set of shelves, a pallet on a floor, a bin and/or a series of bins, or similar structures may be considered to be an item location 113.

Items 116 include physical goods available for order and shipment from the fulfillment center 100. Items 116 may include, for example, books, compact discs (CDs), digital video discs (DVDs), televisions, cameras, stereo systems, computers, pots, pans, appliances, exercise equipment, power tools, garden tools, furniture, toys, clothes, cosmetics, medicine, medical supplies, jewelry, sporting goods and/or equipment, meat, fruit, vegetables, canned goods, dairy products, and/or other goods or products.

There is no requirement that identical items 116 be stored together at the same or neighboring item locations 113. In some embodiments, it may be more efficient to organize the inventory storage area 103 such that identical or similar items 116 are stored together. For example, all DVD's may be stored in a group or cluster of adjacent item locations 113, with all DVD's corresponding to a particular movie located in a single item location 113. In other embodiments, it may be more efficient to store an item 116 in any item location 113 with sufficient capacity. In such embodiments, multiple instances of the same item 116 may be stored in separate item locations 113 on opposite sides of the inventory storage area 103. For example, DVD's corresponding to a particular move may be located in multiple item locations 113 spread through the inventory storage area 103 for more efficient accessibility in certain situations or scenarios.

The sorting/packing area 106 is where items 116 are sorted and packed for shipment. Within a sorting/packing area 106, items 116 may be located at item location 113 according to various embodiments of the present disclosure. Items 116 at item locations 113 within the sorting/packing area 106 may be located such that pickers may be able to quickly and efficiently retrieve items 116 for fulfillment or shipments. Generally, as items 116 within the item locations 113 of the sorting/packing area 106 are used to fulfill shipments, items 116 at item locations 113 within the inventory storage area 103 are automatically moved from the inventory storage area 103 to the sorting/packing area 106. The automated movement of items from the inventory storage area 103 to the sorting/packing area 106 may be directed by automated systems or processes that track inventory levels at item locations 113 within the sorting/packing area and dispatch employees or automatons to transfer goods from the item locations 113 within the inventory storage area 103 to the item locations 113 within the sorting/packing area 106.

As shipments for particular items 116 are received, one or more pickers may be dispatched to retrieve one or more items 116 from item locations 113 within the sorting/packing area 106. A single picker may retrieve multiple items 116 of a shipment 236 and one or more pickers may be assigned to pick items 116 of the shipment 236. If items 116 are not at item locations 113 within the sorting/packing area 106, or an insufficient quantity of items 116 are located within the sorting/packing area 106, then the pickers may be dispatched to the inventory storage area 103 to retrieve the items 116 and deliver them to the sorting/packing area 106. In some embodiments, pickers may be designated employees at the fulfillment center 100 who retrieve items 116. In other embodiments, pickers may be machines, such as robots or other automatons that retrieve items 116 from the inventory storage area 103.

Pickers generally follow designated pick routes, which are generated to minimize the time and distance necessary for the picker to travel to retrieve the requested items 116 from the items locations 113 within the sorting/packing area 106 or the inventory storage area 103. For a given pick route, a picker may retrieve one or more items 116 corresponding to one or more shipments. The items 116 retrieved may be a number of different items corresponding to one or more shipments or the items 116 may be one or more of the same item 116 corresponding to one or more shipments, depending on the requirements behind planning the pick route.

Figure 2:
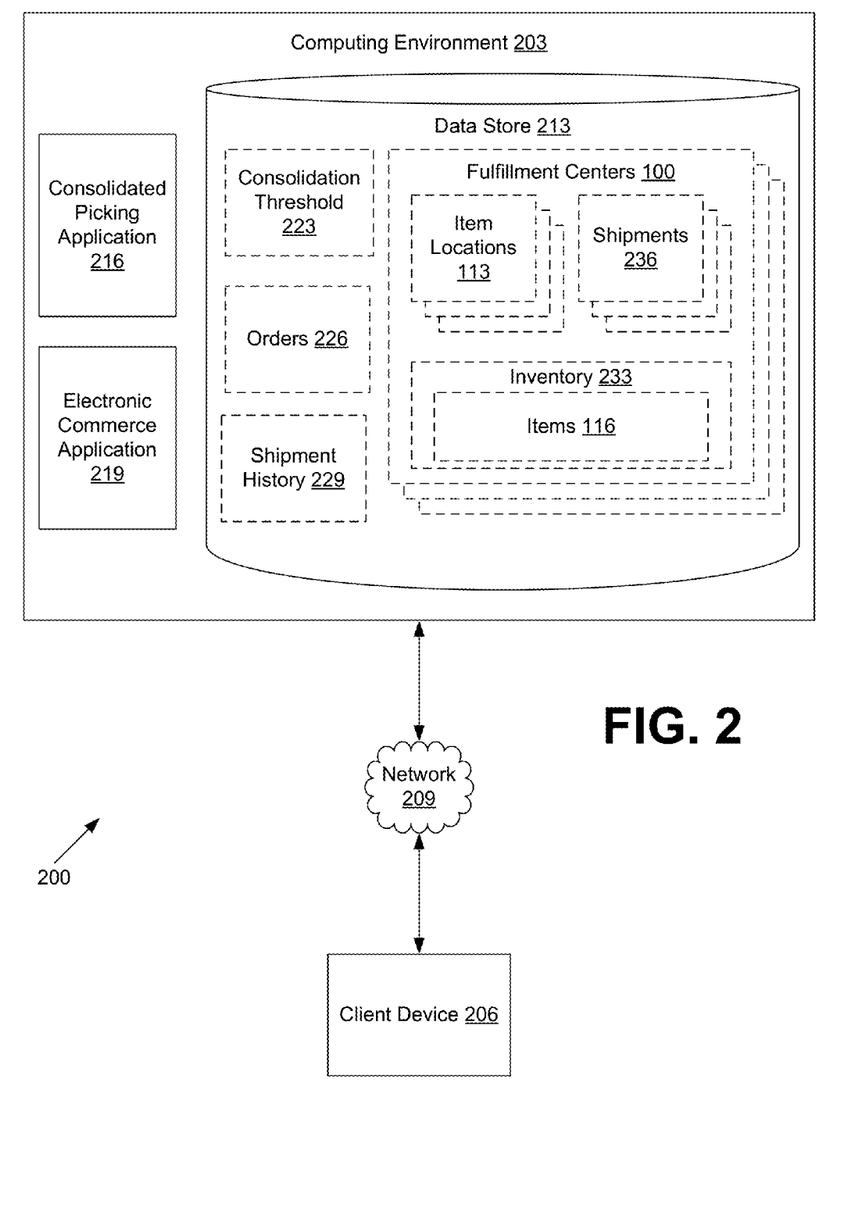
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 213 that is accessible to the computing environment 203. The data store 213 may be representative of a plurality of data stores 213 as can be appreciated. The data stored in the data store 213, for example, is associated with the operation of the various applications and/or functional entities described below. The components executed on the computing environment 203, for example, include consolidated picking application 216 and the electronic commerce application 219, and other applications, services, processes, systems, engines, or functionality not discussed in detail herein.

The consolidated picking application 216 is executed to consolidate picking of items 116 from item locations 113 depending on the current shipment volume of items 116. The consolidated picking application 216 may delay the addition of items 116 to pick routes in order to generate one or more pick routes dedicated to retrieving a multitude of a particular item 116, as will be further described herein.

The electronic commerce application 219 is executed in order to facilitate the online purchase of items 116 over the network 209. The electronic commerce application 219 also performs various backend functions associated with the online presence of a merchant in order to facilitate the online purchase of items 116. For example, the electronic commerce application 219 generates network pages such as web pages or other types of network content that are provided to client devices 206 for the purposes of selecting items for purchase, rental, lease, or other form of consumption.

The data stored in the data store 213 includes, for example, a consolidation threshold 223, one or more orders 226, a shipment history 229, data related to one or more fulfillment centers 100, and potentially other data. For each fulfillment center 100, the data store 213 may also store information related to the item locations 113 within each fulfillment center and inventory 233 of items 116 stored in each fulfillment center 100 as well as each shipment 236 assigned to the fulfillment center 100 for fulfillment.

The consolidation threshold 223 represents one or more values or conditions which, when met, indicate that the consolidated picking application 216 should remap a plurality of shipments 236 or remap individual item locations 113 for picking of items 116 in the plurality of shipments 236 to the same item location 113 so that a single picker can fulfill the plurality of shipments with one stop at the item location 113. For example, the consolidation threshold 223 may represent a minimum number of shipments 236 for an item 116 for which remapping of shipments 236 to an item location 113 is economical, practical, or otherwise satisfies a cost/benefit analysis. In some embodiments the consolidation threshold 223 may be equal to a defined or preset value. In various embodiments, the consolidation threshold 223 may be empirically derived by the consolidated picking application 216 based at least in part on the shipment history 229 using various machine learning approaches, such as neural networks, Bayesian networks, decision trees, and/or other machine learning approaches. In some embodiments, a hybrid of the previous two approaches may be used, whereby the consolidation threshold 223 is initially set equal to a defined value, which is then updated using various machine learning approaches as previously described.

The orders 226 are representative of one or more customer orders 226 placed through the electronic commerce application 219 for purchase and/or lease of one or more items 116. Individual orders 226 may correspond to a single shipment 236 of one or more items 116 or a plurality of shipments 236, each of which may contain one or more items 116 ordered and each of which may be shipped from the inventory 233 of multiple fulfillment centers 100. For example, an order 226 for a book and a DVD may be fulfilled by one shipment 236 originating from a fulfillment center 100 or by two separate shipments 236 from the same or different fulfillment centers 100. The number of shipments 236 that correspond to an order 226 and whether the shipments 236 originate from the same or different fulfillment centers 100 depends on factors such as the location of particular fulfillment centers 100, available inventory at particular fulfillment centers, shipping costs associated with each shipment 236, and other factors.

The shipment history 229 is representative of previously placed and/or fulfilled shipments for items 116 from the fulfillment center 100. In some embodiments, the shipment history 229 may include details such as the items 116 included in each shipment 236, how long it took to fulfill the shipment 236, the cost of the shipment 236, the frequency of recurring shipments 236, and other such data. In some embodiments, the shipment history 229 may also include data such as the cancellation rate or consolidation rate of shipments 236 of a given item 116. The shipment history 229 may be used by various embodiments to empirically determine an appropriate consolidation threshold 223 for shipments 236 involving particular items 116 or to determine whether to lock or remap fulfillment of individual shipments 236 from individual item locations 113 to a particular item location 113, as further described herein.

The fulfillment centers 100 are representative of individual fulfillment centers 100 within a fulfillment or distribution network. Each fulfillment center 100 may be representative of a warehouse, distribution center, shipping center, or similar structure within a network of fulfillment centers 100.

The item locations 113 represent the physical location of items 116 within a particular fulfillment center 100. As such, the item locations 113 stored in the data sore 213 facilitate tracking the locations of items 116 of inventory 233 within a particular fulfillment center 100.

The inventory 233 represents the items 116 stored in the fulfillment center. Inventory 233 may include the quantity of the items 116 in a particular fulfillment center 100. Inventory 233 may also include the quality of particular items 116 (e.g. new, used, refurbished, etc.) that may be found in the particular fulfillment center 100.

The shipments 236 are representative of one or more shipments 236 of items 116 from a fulfillment center 100 to satisfy a respective customer order 226 out of a potential plurality of customer orders 226. Each shipment 236 may be for one or more items 116 from the inventory 233. Accordingly, each order 226 may correspond to one or more shipments 236 assigned to one or more fulfillment centers 100. In some embodiments, individual items 116 of individual shipments 236 may be initially mapped to an individual item location 113 for fulfillment. Accordingly, the same item 116 included in multiple shipments 236 may initially be mapped to different item locations 113, such that an item 116 used to fulfill a first shipment 236 may be retrieved from a different item location 113 in the fulfillment center 100 than the item 116 used to fulfill a second shipment 236.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client device 206 may be configured to execute various applications such as, for example, a browser, a dedicated application, email applications, social network applications, word processors, spreadsheets, and so forth.

Next, a general description of the operation of the various components of the networked environment 200 is provided. To begin, customers place orders 226 for items 116 through the electronic commerce application 219. The electronic commerce application 219 creates one or more shipments 236 to correspond to each order 226, and assigns each shipment 236 to one of the fulfillment centers 100. The electronic commerce application 219 then maps each item 116 in each shipment 236 to an item location 113 in the fulfillment center 100. Items 116 are subsequently retrieved or picked from the item location 113 by a picker to fulfill the shipment 236.

The consolidated picking application 216 monitors the shipments 236 assigned to each fulfillment center 100. If the number of shipments 236 assigned to a particular fulfillment center 100 for a particular item 116 in the inventory 233 of the fulfillment center 100 exceeds a value specified by the consolidation threshold 223, then the consolidated picking application 216 remaps fulfillment of the item 116 included in each shipment 236 of the item 116 to a particular item location 113. The consolidated picking application 216 subsequently initiates a picking of the items 116 from the item location 113, such that all of the items 116 are picked in a single trip by a given picker instead of being picked over the course of multiple trips by one or more pickers.

Among the multiple advantages of the various embodiments described herein is an improved efficiency in fulfilling multiple shipments that include the same item 116. In fulfillment centers 100 where shipments 236 are fulfilled as they are assigned, a picker may traverse, for each shipment 236, a pick route that includes a stop at the mapped item location 113 to retrieve the item 116 to be shipped. In scenarios where multiple shipments 236 include the same item 116, one or more pickers may traverse one pick route for each shipment 236. In contrast, according to the various embodiments of the present disclosure, a picker may fulfill a plurality of shipments 236 for the same item 116 while traversing a single pick route. This decreases the number of pick routes traversed by a picker and the amount of time spent by a picker on a pick route, thereby increasing the efficiency of the pickers within the fulfillment center 100 as well as resulting in other benefits and advantages.

Figure 3:
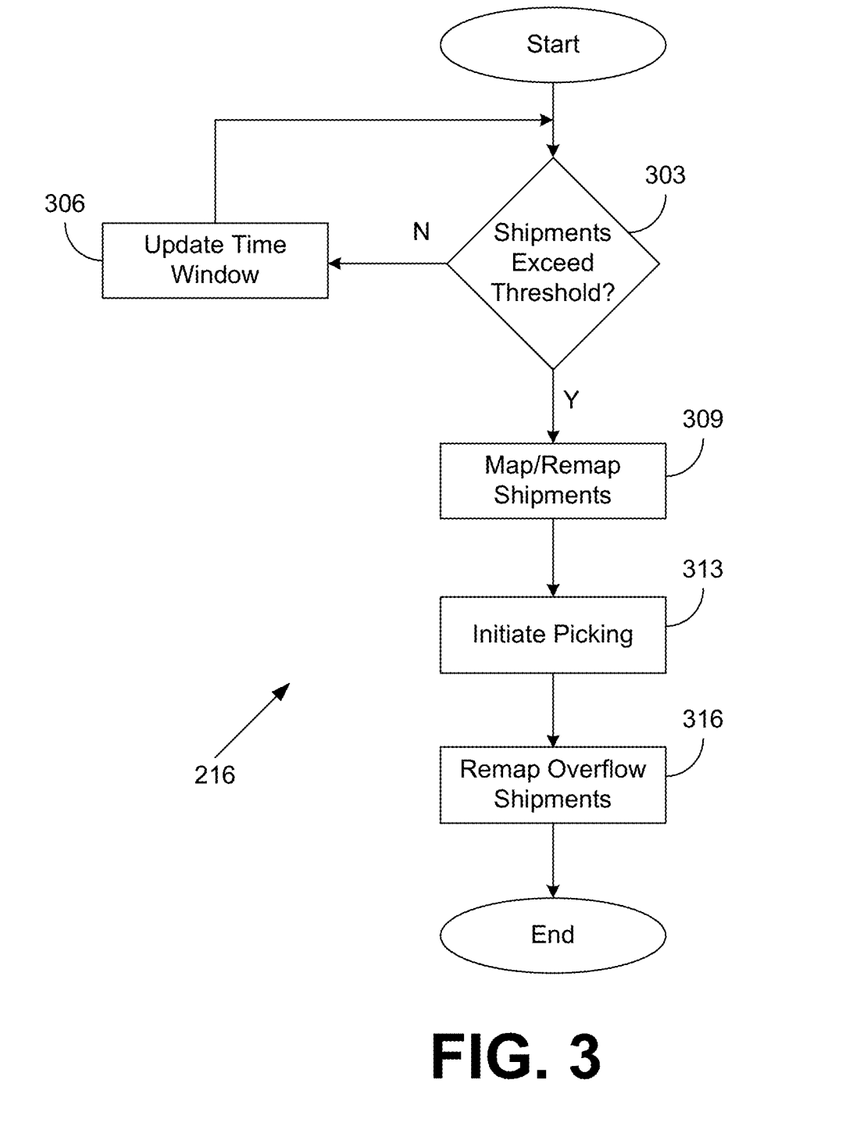
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the consolidated picking application 216 according to various embodiments. It is understood that the flowchart of FIG. 3 provides merely an example of the many different types of functional arrangements that may be employed to implement the operation of the portion of the consolidated picking application 216 as described herein. As an alternative, the flowchart of FIG. 3 may be viewed as depicting an example of elements of a method implemented in the computing environment 203 (FIG. 2) according to one or more embodiments.

To begin, it is assumed that shipments 236 (FIG. 2) are assigned to a fulfillment center 100 (FIG. 2) for fulfillment. As shipments 236 are assigned to the fulfillment center 100, they are initially mapped to an item location 113 (FIG. 1) within the fulfillment center 100 corresponding to an item 116 (FIG. 2) included in the shipment 236. Pick routes are then generated for pickers to retrieve the items 116 from the inventory storage area 103 (FIG. 1).

Moving to box 303, the consolidated picking application 216 determines whether currently unfulfilled shipments 236 that have an item 116 in common exceed a consolidation threshold 223 (FIG. 2) for a defined period or window of time. For example, the consolidated picking application 216 may determine that the number of shipments 236 for a particular item 116 (FIG. 2) equals or exceeds a number specified by the consolidation threshold 223. In some embodiments, the consolidated picking application 216 may further determine and/or require that the number of shipments 236 for the particular item 116 exceeds the consolidation threshold 223 by a specified amount. In such embodiments, the specified amount provides a buffer to account for potential cancellations of orders 226 or shipments 236 during the remapping process described in box 309. For example, between the time that remapping begins and ends, as described in box 309, one or more orders and/or shipments may be cancelled such that the number of shipments no longer exceeds the consolidation threshold 223. Including a buffer reduces such a risk. If the consolidated picking application 216 determines that the shipments 236 do not exceed or satisfy the condition(s) specified by the consolidation threshold 223, then execution proceeds to box 306. However, if the consolidated picking application 216 does determine that the shipments 236 satisfy the condition(s) specified by the consolidation threshold 223, then execution proceeds to box 309.

Moving to box 306, the consolidated picking application 216 updates the time window used for the determination made at box 303. For example, in embodiments where the consolidated picking application 216 makes a determination based on orders 226 and/or shipments 236 placed or requested within a recent amount of time, such as four hours or other time periods, the consolidated picking application 216 may adjust the time window by a period, such as 15 minutes or other adjustments, and delay execution of the next step accordingly. This permits the consolidated picking application 216 to keep a running tally of shipments 236 which have been requested but not yet fulfilled, while allowing normal fulfillment processes to proceed in parallel with the execution of the consolidated picking application 216. After the time window is updated, execution loops back to box 303.

However, assuming that the consolidated picking application 216 determines that the shipments 236 having an item 116 in common exceed the consolidation threshold 223 in box 303, then in box 309, the consolidated picking application 216 remaps individual shipments 236 involving the item 116 to a new item location 113. Remapping involves changing the item location 113 from which a picker will retrieve the item 116 for an individual shipment 236 to an item location 113 where a picker may retrieve multiple ones of the item 116 to satisfy multiple shipments 236. However, in those embodiments where items 116 included in shipments are not initially mapped for picking to a particular item location 113, the initial mapping of the item 116 to an item location 116 for picking may occur at box 309. After an item 116 included in a shipment 236 has been mapped or remapped to an item location 113, the consolidated picking application 216 locks the item 116 included in the shipment 236 to the mapped or remapped item location 113 to prevent additional mappings or remappings before picking and/or fulfillment. In some embodiments, locking may involve an indication to or notation by the consolidated picking application 216 that the item 116 is ineligible for mapping or remapping to another item location 113 in a later iteration of the approach depicted in FIG. 3.

In some embodiments, the consolidated picking application 216 may preferentially select an item location 113 to remap multiple shipments 236, as discussed above, according to one or more criteria. For example, the consolidated picking application 216 may preferentially select an item location 113 in the inventory storage area 103 (FIG. 1) of a fulfillment center 100 (FIG. 1) that is closest to a sorting/packing area 106 (FIG. 1) to minimize the length and/or duration of the pick route or retrieval. As another example, the consolidated picking application 216 may preferentially select an item location 113 with a sufficient quantity of items 116 to satisfy all outstanding shipments 236 for the item 116 in order to minimize the number of trips and/or pick routes necessary.

In some embodiments, the consolidated picking application 216 may preferentially select item locations 113 that are most accessible to a picker. For example, a pallet of items 116 on the top shelf in a warehouse may require a special forklift or other machinery to reach. Accordingly, the consolidated picking application 216 may exclude that item location 113 from consideration or prefer other, more accessible, available item locations 113. Alternatively, the consolidated picking application 216 may select the item location 113 and cause the necessary equipment to be provided to the location so that the picker can pick the items.

In some embodiments, the consolidated picking application 216 may also preferentially select an item location 113 with full pallets and/or lots compared with item locations 113 with partial pallets and/or lots, or vice versa, in order to minimize the amount of time spent sorting and/or separating items 116. To illustrate the example, if there are 500 items 116 in a pallet of items 116 and the consolidated picking application 216 has detected a sufficient demand for shipping 500 or more items 116, then the consolidated picking application 216 may preferentially remap shipments 236 to an item location 113 with a full pallet of 500 items 116 so that the entire pallet of items can be picked. In contrast, if the consolidated picking application 216 has determined that there is demand for shipping only 250 items 116, then the consolidated picking application may preferentially remap shipments 236 to an item location 113 with a partial pallet of 300 items 116. In these instances, the consolidated picking application 216 is selecting the appropriate item location 113 necessary for minimizing retrieval time by avoiding unnecessary labor involved in breaking down a pallet of items 116.

Referring next to box 313, the consolidated picking application 216 initiates picking of the items 116 from the remapped item location 113. Initiation of picking may involve communicating to a picker to retrieve the items 116 from the remapped item location 113. For example, the consolidated picking application 216 may send an electronic message to an employee device with directions to the item location 113 and specifying the number of items 116 to be picked. In other embodiments, initiation of picking may involve the consolidated picking application 216 generating a pick route that includes the remapped item location 113 and adding the generated pick route to a queue of pick routes. Alternatively, the consolidated picking application 216 may send a message to a scheduling system requesting a pick route be generated that includes the remapped item location 113. In some embodiments, the consolidated picking application 216 may further update the status of the shipments 236 to "fulfilled" or "in fulfillment" to prevent attempts to fulfill the shipments 236 twice, either by the consolidated picking application 216 or other fulfillment applications.

In some embodiments, additional pick routes may also be generated for remaining items 116 within the individual shipments 236. In such embodiments, these additional pick routes will have the same destination in the sorting/packing area 106 (FIG. 1) as pick route including the remapped item location 113. Execution subsequently proceeds to box 316.

Moving to box 316, the consolidated picking application 216 unlocks and remaps overflow shipments 236. Overflow shipments 236 are shipments 236 for the item which could not be fulfilled from the remapped item location 113. For example, in those embodiments where a buffer of shipments 236 is included to account for order 226 or shipment 236 cancellations, the number of orders 226 and/or shipments 236 cancelled may be less than the number of orders 226 and/or shipments accounted for by the buffer. Accordingly, a small number of shipments 236 may be unable to be fulfilled from the remapped item location 113 as anticipated. These overflow shipments 236 are therefore unlocked and remapped to other item locations 113 within the fulfillment center 100 for eventual fulfillment. Appropriate pick routes may then be created to facilitate fulfillment of such shipments 236.

For example, 500 shipments 236 for one unit each of an item 116 may be fulfilled from a pallet of 500 units of the item 116. Accordingly, the consolidated picking application 216 may remap 550 shipments 236 for one unit each of the item 116 to the pallet of 500 units of the item 116. This would provide for a buffer of 50 shipments 236 of one unit each. If 30 shipments 236 of one unit each are cancelled, for example as a result of the cancellation of 30 corresponding orders 226, then there would be an overflow of 20 shipments 236 which would need to be remapped as described above. Execution subsequently ends.

Figure 4:
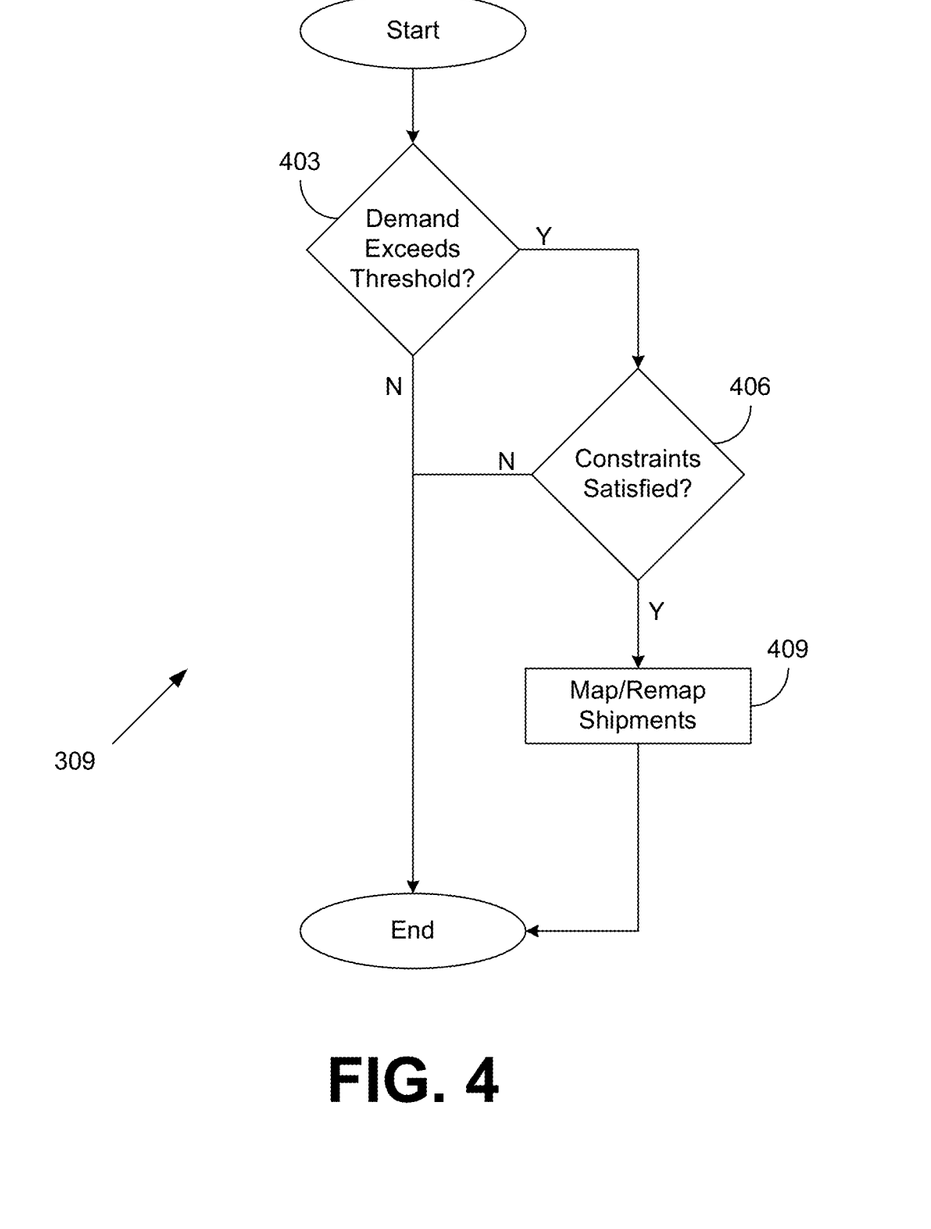
FIG. 4 is a flowchart illustrating one example of functionality implemented as portions of an application executed in a computing environment in the networked environment of FIG. 2 according to various embodiments of the present disclosure.

With reference to FIG. 4, shown is a flowchart that provides one example of the operation of box 309 depicted in the flowchart of FIG. 3 according to various embodiments. It is understood that the flowchart of FIG. 4 provides merely an example of one of the many different types of functional arrangements that may be employed to implement the operation of the portion of the consolidated picking application 216 (FIG. 2) as described herein. As an alternative, the flowchart of FIG. 4 may be viewed as depicting an example of elements of a method implemented in the computing environment 203 (FIG. 2) according to one or more embodiments.

Beginning with box 403, it is assumed that the consolidated picking application 216 has received one or more requests for shipments 236 (FIG. 2) of one or more items 116 (FIG. 2). It is further assumed that individual shipments 236 requested have been initially mapped to an item location 113 from which the individual shipment 236 will be fulfilled. In response, the consolidated picking application 216 determines whether the demand, as measured by the quantity of items 116 to be shipped or some other metric, meets or exceeds a threshold or otherwise satisfies a condition. For example, the consolidated picking application 216 may determine that the quantity of items 116 is greater than the quantity of items 116 located at an item location 113 within the inventory storage area 103 (FIG. 1) of a fulfillment center 100 (FIG. 1). Such an item location 113 may include, for example, a full and/or unopened pallet of items 116. If the consolidated picking application 216 determines that the quantity of items 116 exceeds the predefined threshold, then execution proceeds to box 406. Otherwise, execution ends.

Moving on to box 406, the consolidated picking application 216 determines whether one or more constraints would be satisfied if fulfillment of an item 116 included in multiple ones of the shipments 236 were to be remapped to a particular item location 113, such as an item location 113 within the inventory storage area 103. Such constraints may include satisfying a customer delivery time or window for one or more of the shipments 236, a labor cost involved in remapping the shipments 236 compared to a labor savings from remapping the shipments 236, as well as the position of the item location 113 within the fulfillment center 100. For example, if a customer delivery window for several of the shipments 236 could not be met if the shipments were remapped, then the consolidated picking application 216 might determine that some or none of the shipments 236 are eligible for remapping. Likewise, if the labor costs involved with remapping shipments 236 to a particular item location 113 exceed the labor costs from individually fulfilling the shipments 236, then the consolidated picking application 216 might determine not to remap shipments 236 to an item location 113. As another example, the position of the item location 113 may impose a constraint, impacting the labor costs and/or impacting fulfillment of other shipments 236 not being remapped by the consolidated picking application 216.

Moving on to box 409, the consolidated picking application maps and/or remaps shipments 236 to an item location 113 with a sufficient quantity of items 116 to fulfill all of the mapped and/or remapped shipments 236. Remapping involves changing the item location 113 from which a picker will retrieve the item 116 for an individual shipment 236 to an item location 113 where a picker may retrieve multiple ones of the item 116 to satisfy multiple shipments 236. However, in those embodiments where items 116 included in shipments are not initially mapped for picking to a particular item location 113, the initial mapping of the item 116 to an item location 116 for picking may occur. Execution subsequently ends.

Figure 5:
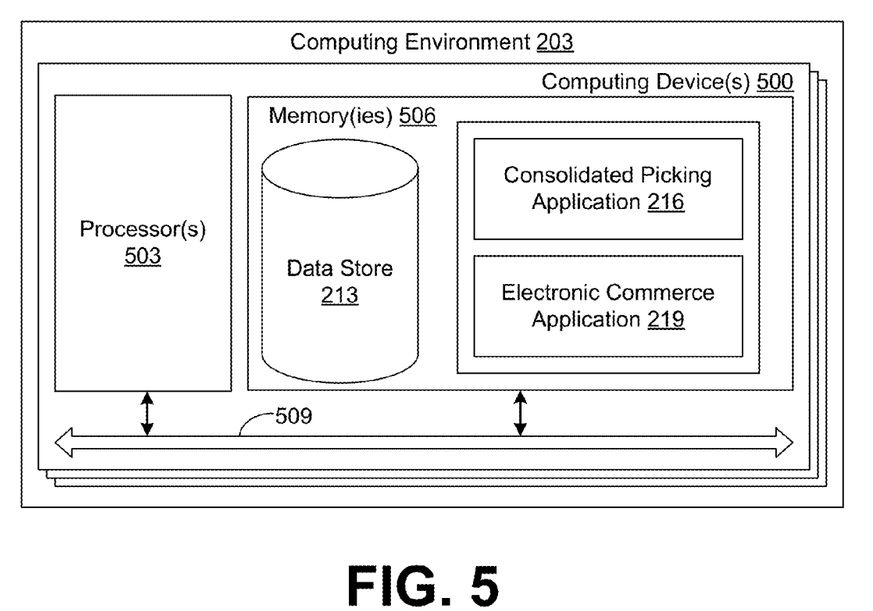
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the consolidated picking application 216 and the electronic commerce application 219, and potentially other applications. Also stored in the memory 506 may be a data store 213 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the consolidated picking application 216 and the electronic commerce application 219, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the consolidated picking application 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including consolidated picking application 216 and the electronic commerce application 219, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including consolidated picking application 216 and the electronic commerce application 219, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed, causes the at least one computing device to at least:
   determine a threshold representing a minimum number of shipments;
   determine whether a metric representing a plurality of shipments exceeds the threshold during a period of time specified by a sliding time window, wherein individual items in the plurality of shipments are mapped to corresponding ones of a plurality of item locations in a fulfillment center;
   identify a subset of the plurality of item locations, wherein individual ones of the subset of item locations are accessible along a pick route;
   select an individual one of the plurality of item locations from the subset of item locations based at least in part on whether all available items located at the individual one of the plurality of item locations will be used to complete the picking and based at least in part on a distance of the pick route that includes the individual one of the plurality of item locations; and
   direct retrieval of an item included in the plurality of shipments from the individual one of the plurality of item locations after the plurality of shipments are remapped to the individual one of the plurality of item locations.

2. The non-transitory computer-readable medium of claim 1, wherein the threshold is based at least in part on a history of shipments.

3. The non-transitory computer-readable medium of claim 1, wherein the program, when executed, is further configured to cause the at least one computing device to at least update the period of time by an amount equal to the sliding time window.

4. A system, comprising:
   at least one computing device; and
   an application executed in the at least one computing device, the application causing the at least one computing device to at least:
      determine whether a metric representing a plurality of shipments exceeds a threshold, wherein individual items in the plurality of shipments are mapped to respective ones of a plurality of item locations in a fulfillment center and the threshold represents a minimum number of shipments necessary to recoup a cost associated with a remapping of the plurality of shipments to an individual one of the plurality of item locations;
      remap an item included in multiple ones of the plurality of shipments to the individual one of the plurality of item locations in response to a determination that the metric exceeds the threshold; and
      initiate a picking of the item from the individual one of the plurality of item locations in response to remapping of the item to the individual one of the plurality of item locations.

5. The system of claim 4, wherein the application is further configured to cause the at least one computing device to at least determine whether the metric exceeds the threshold within a sliding time window.

6. The system of claim 4, wherein the application is further configured to cause the at least one computing device to at least:
   identify a subset of the plurality of item locations, wherein individual ones of the subset of item locations are accessible on a pick route; and
   select the individual one of the plurality of item locations from the subset of item locations.

7. The system of claim 6, wherein the application is further configured to cause the at least one computing device to at least select the individual one of the plurality of item locations preferentially based at least in part on whether all available items at the individual one of the plurality of item locations may be used to complete the picking.

8. The system of claim 6, wherein the application is further configured to cause the at least one computing device to at least select the individual one of the plurality of item locations based at least in part on a distance of a pick route that includes the individual one of the plurality of item locations.

9. The system of claim 4, wherein the application is further configured to cause the at least one computing device to at least direct retrieval of the item from the individual one of the plurality of item locations.

10. The system of claim 4, wherein the metric represents at least a quantity of the plurality of shipments.

11. The system of claim 4, wherein the application is further configured to cause the at least one computing device to at least determine the threshold based at least in part on a history of shipments.

12. The system of claim 4, wherein the threshold comprises a predefined value and the application is further configured to cause the at least one computing device to at least update the threshold based at least in part on a history of shipments.

13. The system of claim 4, wherein the application is further configured to cause the at least one computing device to at least determine whether a constraint is satisfied and wherein the remapping of the item comprises remapping the item remaps in response to a determination that the constraint is satisfied.

14. The system of claim 13, wherein the constraint includes a delivery time, a delivery window, and a position within a fulfillment center of the individual one of the plurality of item locations.

15. A computer-implemented method, comprising:
   determining whether a plurality of shipments assigned to a fulfillment center within a time window exceeds a threshold, wherein each of the plurality of shipments includes an item;

associating the item with an item location in the fulfillment center in response to a determination that the plurality of shipments exceeds the threshold;

updating the time window in response to a determination that the plurality of shipments does not exceed the threshold;

locking the item to the item location in response to associating the item with the item location; and initiating a picking of the item for each of the plurality of shipments from the item location in response to locking the item to the item location.

16. The computer-implemented method of claim 15, further comprising selecting the item location based at least in part upon a determination that the item location includes a full pallet of the item.

17. The computer-implemented method of claim 15, further comprising determining a buffer number of shipments based at least in part on a shipment history.

18. The computer-implemented method of claim 17, wherein the threshold specifies a threshold number of shipments and locking the item to the item location is further in response to determining that the plurality of shipments equals or exceeds a sum of the threshold number of shipments and the buffer number of shipments.

19. The non-transitory computer-readable medium of claim 1, wherein the program, when executed, is further configured to cause the at least one computing device to at least periodically update the threshold.

20. The non-transitory computer-readable medium of claim 19, wherein the threshold is updated based at least in part on a plurality of shipments initiated within the sliding time window.

\* \* \* \* \*